(12) United States Patent
Manabe et al.

(10) Patent No.: US 7,155,731 B2
(45) Date of Patent: Dec. 26, 2006

(54) OPTICAL DISC DRIVE HAVING A FUNCTION OF PREVENTING AN OPTICAL DISC FROM BEING PUSHED DOWN BY TURBULENCE IN THE AIR FLOW GENERATED BY THE ROTATION OF THE OPTICAL DISC

(75) Inventors: Satoru Manabe, Kanagawa (JP); Kiyofumi Sato, Kanagawa (JP); Tsuneo Uwabo, Tokyo (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 10/421,599

(22) Filed: Apr. 23, 2003

(65) Prior Publication Data

US 2003/0198170 A1    Oct. 23, 2003

(30) Foreign Application Priority Data

Apr. 23, 2002    (JP) .............................. 2002-120742

(51) Int. Cl.
   *G11B 33/12*    (2006.01)
(52) U.S. Cl. ..................................................... 720/652
(58) Field of Classification Search ................ 720/652, 720/655, 656
   See application file for complete search history.

(56) References Cited

U.S. PATENT DOCUMENTS 5,808,996 A * 9/1998 Aoyama ..................... 720/651
6,529,461 B1 * 3/2003 Watanabe et al. ........... 720/732

* cited by examiner

*Primary Examiner*—David Davis
(74) *Attorney, Agent, or Firm*—Patents & TMS, P.C.

(57) ABSTRACT

A disc drive includes a main body having a roughly box-shaped casing and a top plate which covers the upper side of the casing, a disc tray having a disc holding portion in which an optical disc is to be placed and being movable with respect to the main body through an opening formed on the front side of the main body, and a convex portion provided on the top plate so as to protrude inside the main body and having a shape that its horizontal cross-sectional area decreases gradually toward a tip thereof. The convex portion being positioned in a region of the top plate corresponding to the disc holding portion of the disc tray in a state that the disc tray is fully inserted into the main body. The disc drive may further includes a roughly arc-shaped ridge portion formed in the region of the top plate so as to protrude inside the main body. The ridge portion also has a shape that its horizontal cross-sectional area decreases gradually toward a tip thereof. According to the disc drive having the above structure, it is possible to obtain excellent recording and playback characteristics of the optical disc.

10 Claims, 13 Drawing Sheets

OPTICAL DISC DRIVE HAVING A FUNCTION OF PREVENTING AN OPTICAL DISC FROM BEING PUSHED DOWN BY TURBULENCE IN THE AIR FLOW GENERATED BY THE ROTATION OF THE OPTICAL DISC

BACKGROUND OF THE INVENTION

1. Field of the Invention

The present invention is related to a disc drive.

2. Description of the Prior Art

Disc drives which carry out playback or recording/playback of an optical disc such as a CD-ROM, a CD-R, a DVD or the like can be used in a horizontal arrangement in which an optical disc is held in a concave portion of a disc tray which is in a roughly horizontal state, or in a vertical arrangement in which the disc tray is arranged in a roughly vertical state.

FIG. 11 is a plan view showing a prior art optical disc drive which can be used in a vertically arranged state, FIG. 12 is a partial cross-sectional side view (showing the state in which the disc tray is moved to the ejection position) of the optical disc drive shown in FIG. 11, and FIG. 13 is a partial cross-sectional side view showing another example structure of a prior art optical disc drive.

As shown in FIG. 11, the prior art disc drive 900 which can be used in a vertically arranged state includes a main body 920 in which a disc drive unit (not shown in the drawings) equipped with an optical pickup and the like are housed, and a disc tray 910 which is movable between a position (loading position) for loading an optical disc D and a position (ejection position) for ejecting the optical disc D with respect to the main body 920.

The main body 920 is comprised from a roughly box-shaped casing 922, a top plate (cover) 923 and a front bezel 940 provided on the front of the casing 922. An opening 941 is formed in the front bezel 940. The disc tray 910 is moved between the ejection position and the loading position through the opening 941.

A concave disc holding portion 911 for holding an optical disc D is formed in the disc tray 910. A plurality of disc holding members (hooks) 913 are provided on the periphery of the disc holding portion 911 so that they protrude above the disc holding portion 911. The disc holding members 913 are provided for holding an optical disc D placed in the disc holding portion 111 in a freely rotatable manner from the side of the upper surface of the optical disc when the disc drive 900 is used in a vertically arranged state.

In this regard, when these disc holding members 913 are provided on the disc tray 910, there is a case that a part of the optical disc D is accidentally placed on top of one or more disc holding members 913 (see FIG. 11) when the optical disc D is placed in the disc holding portion 911. In such an accidental state, when the disc tray 910 is moved toward the loading position as it is, the optical disc D is conveyed to the inside of the main body 920 in an inclined state with respect to the disc holding portion 911 (i.e., a state in which a portion of the optical disc D protrudes out of the disc holding portion 911). In this case, when the disc tray 910 is moved toward the ejection position from the loading position, the optical disc D becomes caught near the opening 941 (at the upper side rear end of the front bezel 940), and this makes it impossible to move the disc tray 910 (see FIG. 12).

In order to avoid such an accident described above, in the case where such disc holding members 913 are provided on the disc tray in the prior art structure, a protruding member 930 having a rectangular parallelepiped shape is provided on the inside (bottom) surface of the top plate 923 at a position near the opening 941 of the front panel 940. When such a protruding member 930 is provided, even in the case where the disc tray is moved toward the loading position in a state where a portion of the optical disc D is placed on one or more disc holding members 913, the protruding member 930 pushes the optical disc D toward the disc holding portion 911, so that the optical disc D and the disc holding members 913 on which the portion of the optical disc D is lying are bent to the bottom surface of the disc holding portion 911. Accordingly, when the disc tray 910 is moved to the ejection position in this state, the protruding member 930 prevents the optical disc D from being caught near the opening 941, and this makes it possible to move the disc tray 910 to the ejection position.

However, when the top plate 923 is provided with such a protruding member 930 having the rectangular parallelepiped shape, the air flow (i.e., the flow of air) generated at the time the optical disc D is rotated (at high speed) changes abruptly near the protruding member 930 so that the optical disc D is pushed (downward in FIG. 13) toward the disc holding portion 911. Consequently, the recording surface of the optical disc is shifted away from the focusing position of the laser light emitted from the optical pickup, and this has an adverse effect on the recording and playback characteristics. Further, when the spindle motor for rotationally driving the optical disc D reaches a specific rotation number, the optical disc D will resonate with the vibration of the spindle motor. In this case, when the downward force described above is applied to the optical disc D, the inclination of the optical disc D will become even larger, and this results in significantly lowering the recording and playback characteristics of the optical disc D.

SUMMARY OF THE INVENTION

It is an object of the present invention to provide a disc drive which can obtain excellent recording and playback characteristics of an optical disc.

In order to achieve the above mentioned object, the present invention is directed to a disc drive, which comprises: a main body including a roughly box-shaped casing having an opened top side and a top plate which covers the top side of the casing, the main body having a front side in which an opening is formed; a disc tray having a disc holding portion in which an optical disc is to be placed, the disc tray being movable with respect to the main body through the opening thereof; and a convex portion provided on the top plate so as to protrude inside the main body and having a shape that its horizontal cross-sectional area decreases gradually toward a tip thereof. The convex portion is arranged in a region of the top plate corresponding to the disc holding portion of the disc tray in a state that the disc tray is fully inserted into the main body.

The present invention is also directed to a disc drive, which comprises: a main body including a roughly box-shaped casing having an opened top side and a top plate which covers the top side of the casing, the main body having a front side in which an opening is formed; a disc tray having a disc holding portion in which an optical disc is to be placed, the disc tray being movable with respect to the main body through the opening thereof; and a roughly arc-shaped ridge portion provided on the top plate so as to protrude inside the main body. The arc-shaped ridge portion is arranged in a region of the top plate corresponding to the disc holding portion of the disc tray in a state that the disc tray is fully inserted into the main body.

In the disc drive mentioned above, it is preferred that the ridge portion has a shape that its horizontal cross-sectional area decreases gradually toward a tip thereof.

Further, it is also preferred that the ridge portion has a peripheral surface formed as an inclined surface.

Furthermore, it is also preferred that the angle defined by the inclined peripheral surface of the ridge portion and the top plate lies within the range of 100 to 150°.

Moreover, it is also preferred that the ridge portion has a top surface formed into a flat surface. In this case, it is preferred that the distance between the top surface of the ridge portion and a bottom surface of the disc holding portion lies within the range of 8 to 10 mm.

Moreover, it is also preferred that the ridge portion is integrally formed on the top plate. In this case, it is preferred that the ridge portion is formed by press working or drawing process.

Preferably, the disc drive mentioned above further comprises a convex portion provided in the region of the top plate, said convex portion is provided on the top plate so as to protrude inside the main body and has a shape that its horizontal cross-sectional area decreases gradually toward a tip thereof.

In this arrangement, it is preferred that the height of the ridge portion is lower than that of the convex portion.

Further, it is preferred that the convex portion and the ridge portion are partially connected.

Furthermore, it is also preferred that the convex portion is arranged at a position near the opening of the main body.

Moreover, it is also preferred that the convex portion has a function of regulating posture of the optical disc.

Moreover, it is also preferred that the convex portion has a peripheral surface formed as an inclined surface. In this case, it is preferred that the angle defined between the inclined peripheral surface of the convex portion and the top plate lies within the range of 100 to 150°.

Moreover, it is preferred that the convex portion has an elliptical horizontal cross-sectional shape.

Further, it is also preferred that the convex portion has a top surface formed into a flat surface.

Furthermore, it is also preferred that the convex portion is integrally formed on the top plate. In this case, it is preferred that the convex portion is formed by press working or drawing process.

The above and other objects, structures and advantages of the present invention will be more apparent when the following detailed description of the preferred embodiments is considered in conjunction with the appended drawings.

DETAILED DESCRIPTION OF THE PREFERRED EMBODIMENTS

The preferred embodiments of a disc drive according to the present invention will now be described in detail with reference to the appended drawings.

First, a description will be made with regard to a first embodiment of the present invention.

Figure 1:
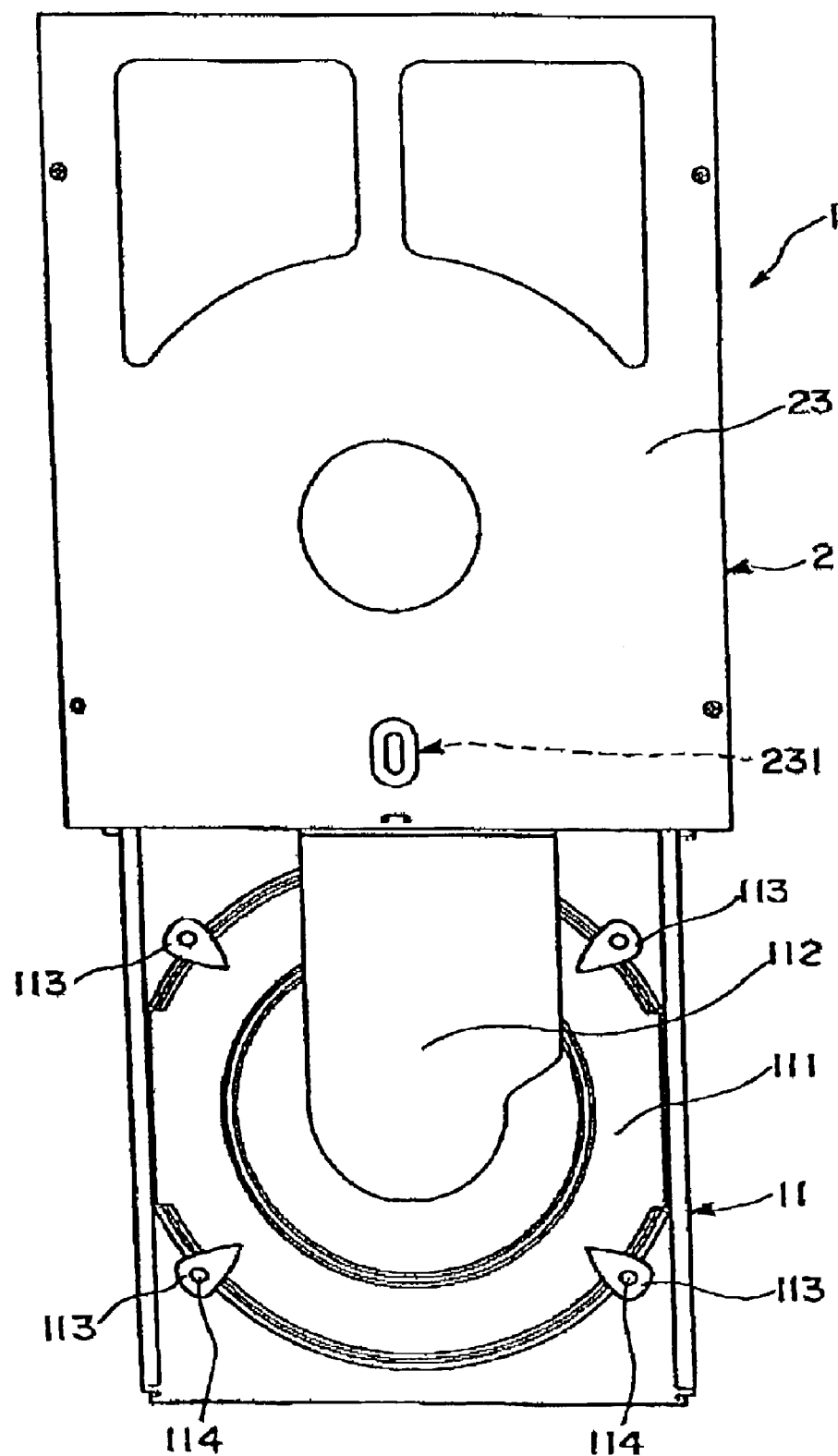
FIG. 1 is a plan view of a first embodiment of a disc drive according to the present invention.
Figure 2:
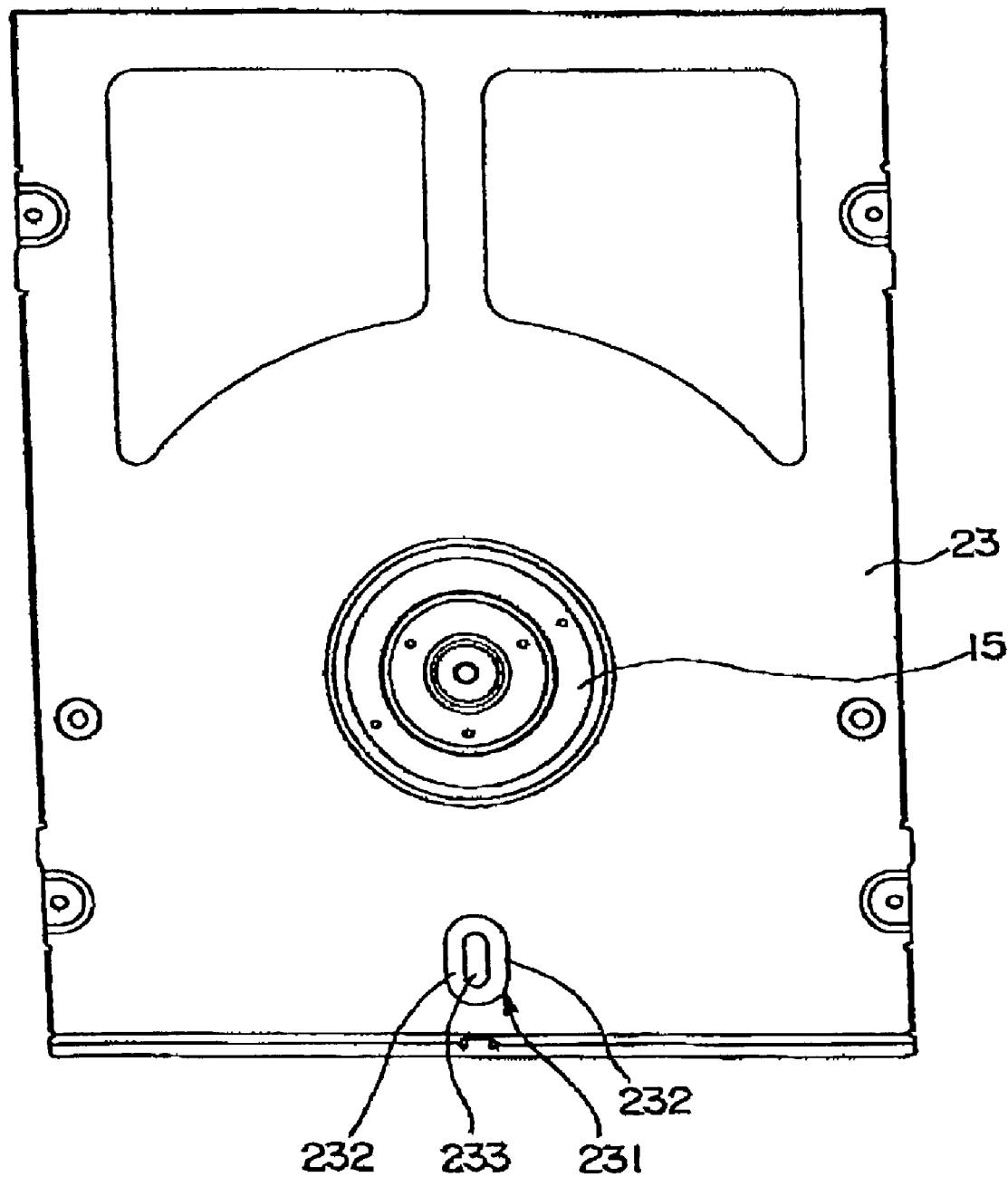
FIG. 2 is a plan view of a top plate of the disc drive, which is viewed from the inside of a main body thereof.
Figure 3:
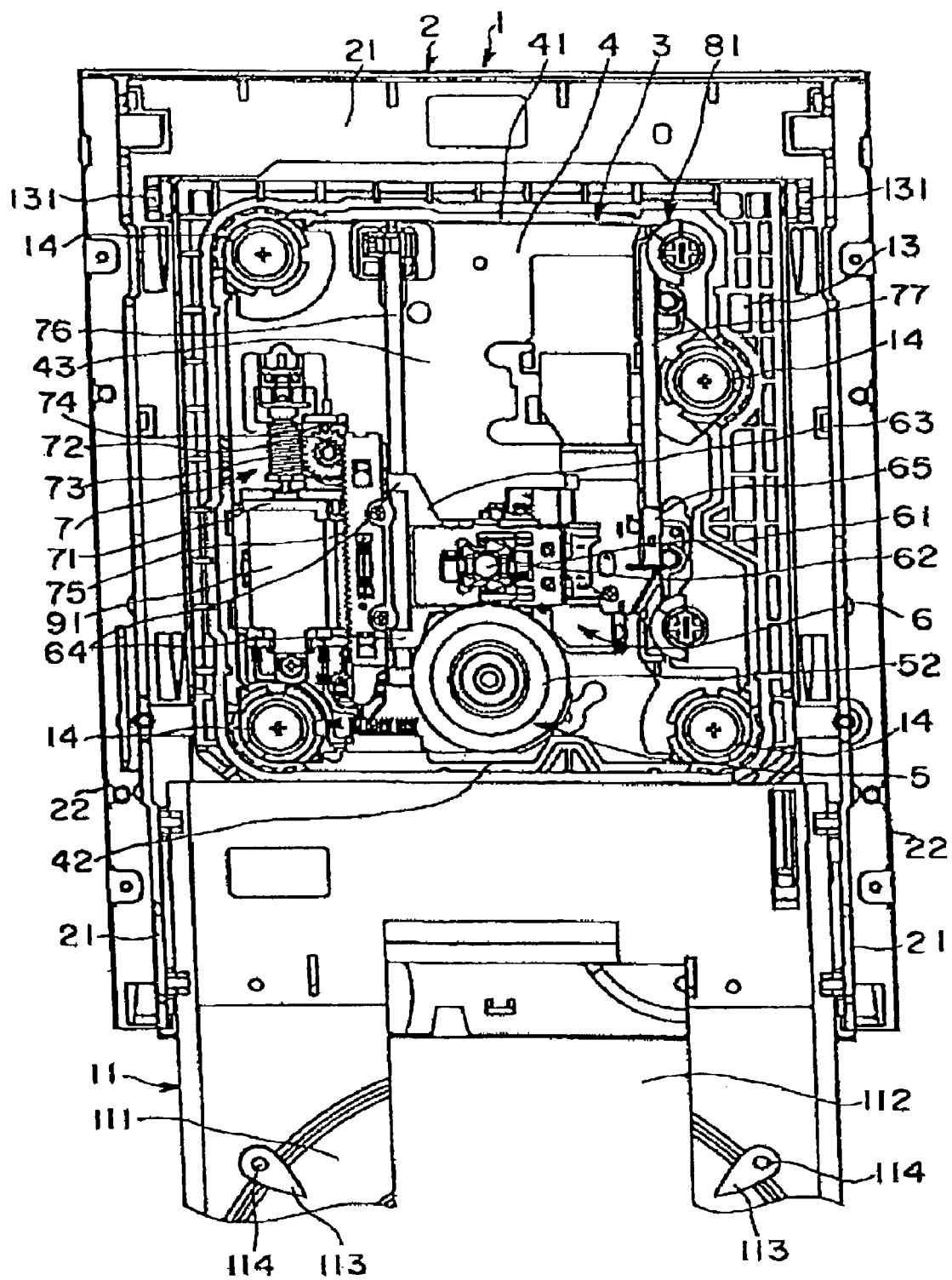
FIG. 3 is a plan view showing a condition that the top plate is removed from the disc drive shown in FIG. 1.
Figure 4:
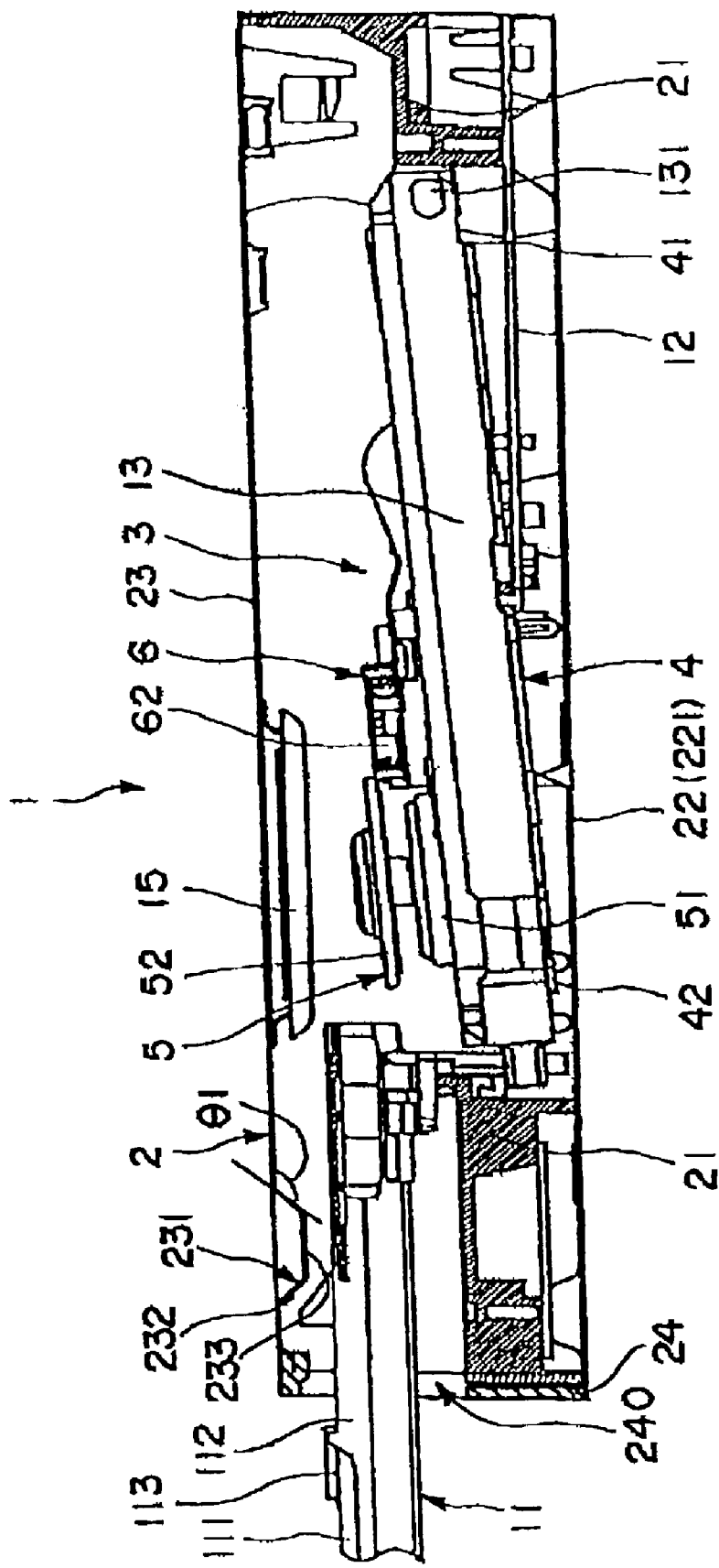
FIG. 4 is a cross-sectional side view which shows the disc drive shown in FIG. 1.
Figure 5:
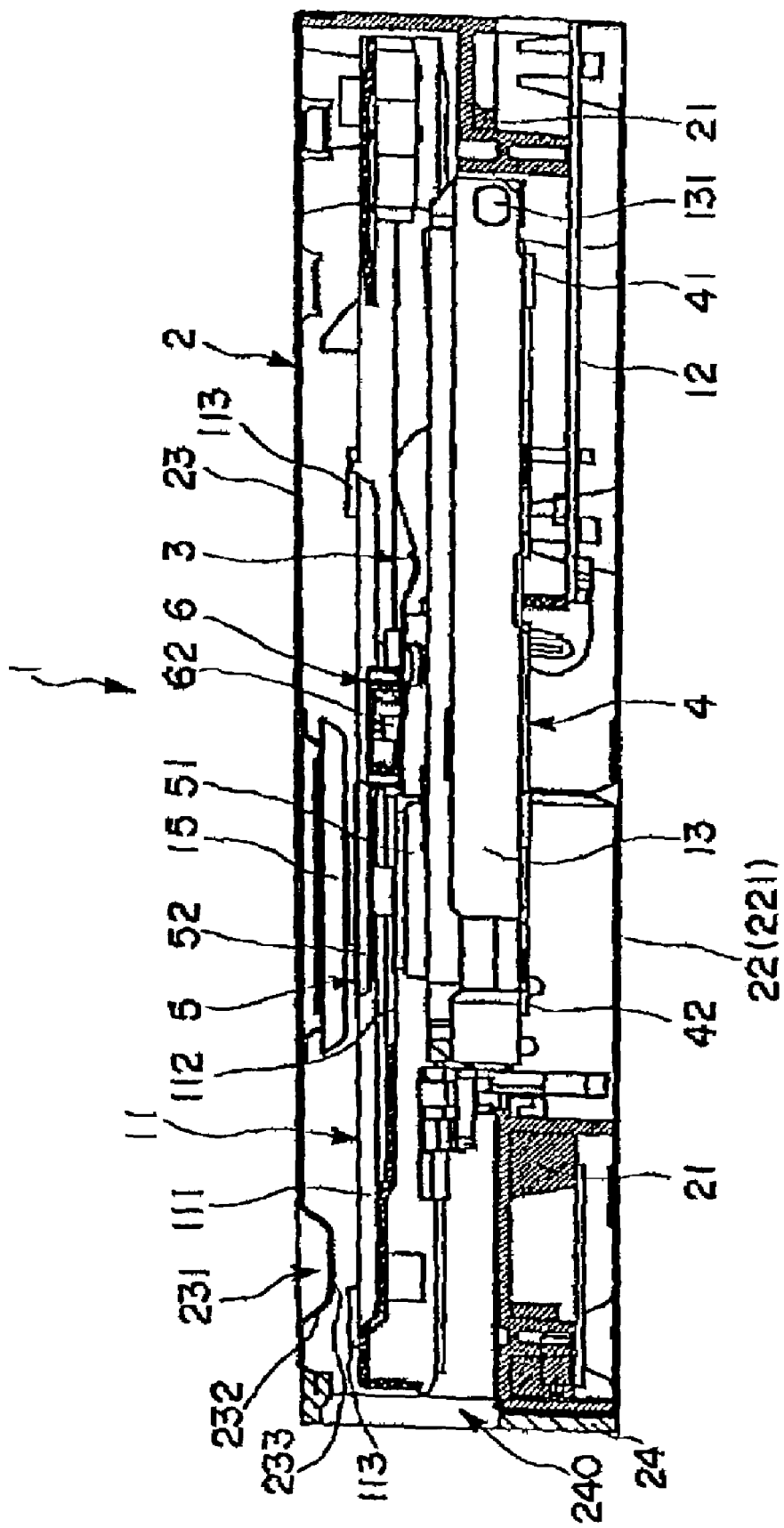
FIG. 5 is a cross-sectional side view which shows the disc drive shown in FIG. 1.
Figure 6:
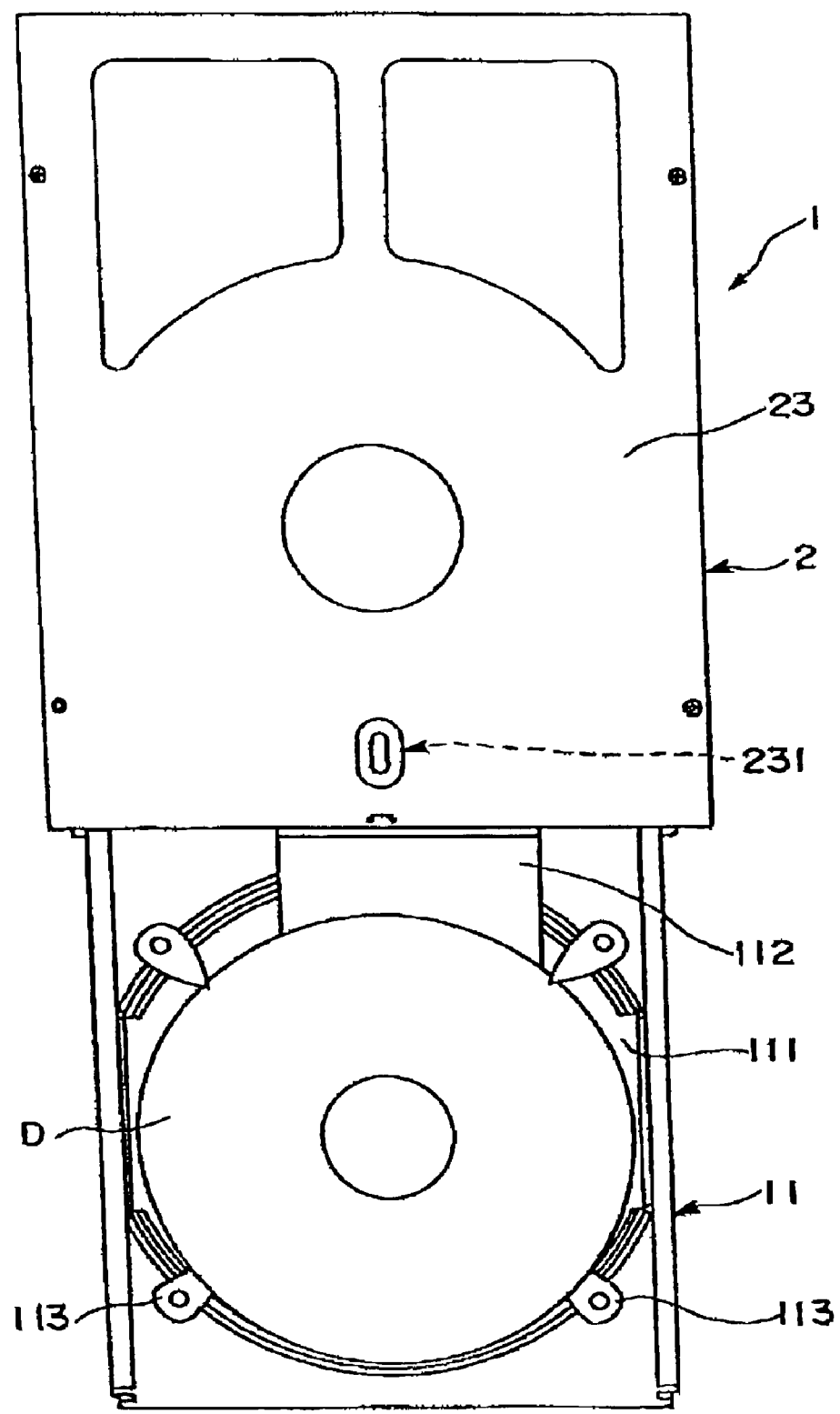
FIG. 6 is a plan view showing a condition that an optical disc is erroneously placed in a disc tray of the disc drive (erroneously placed state).
Figure 7:
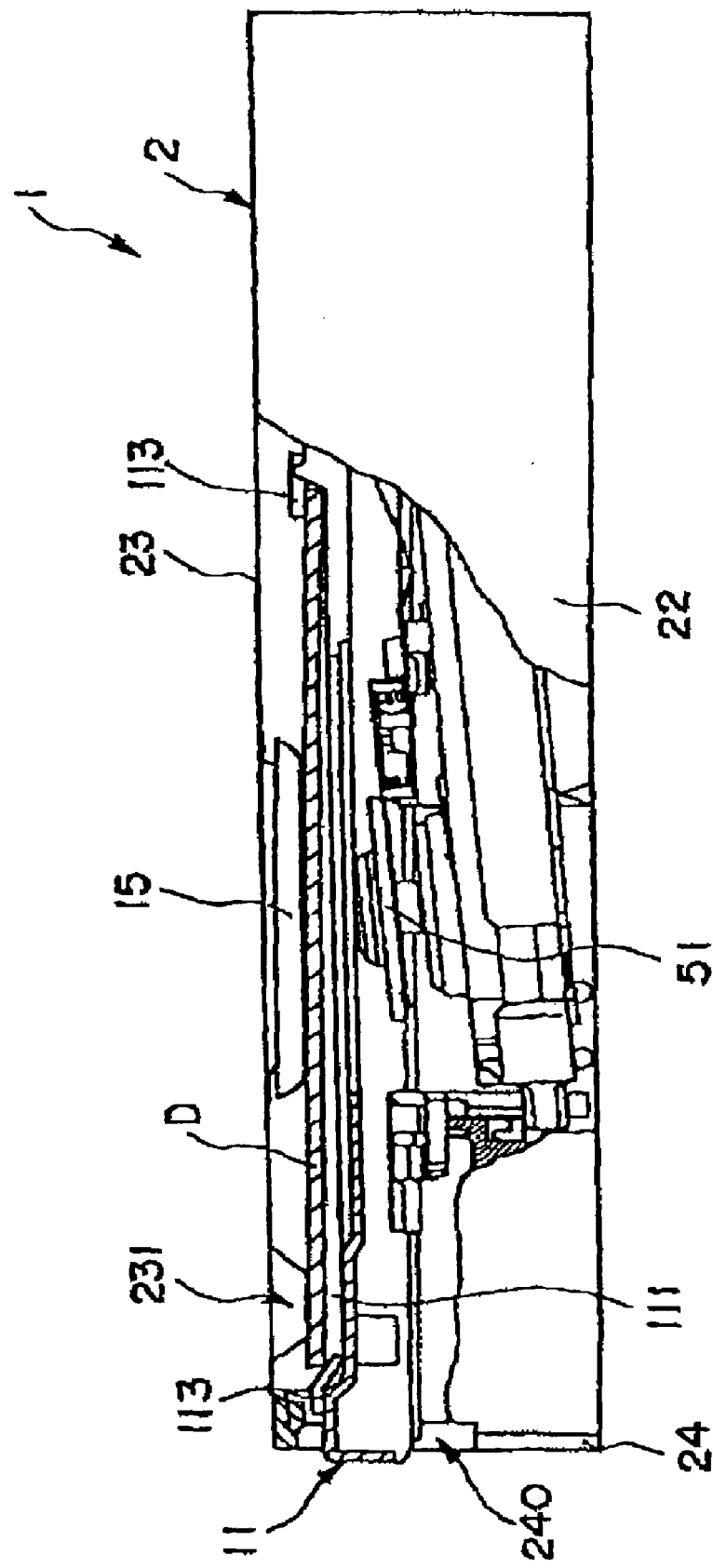
FIG. 7 is a cross-sectional side view showing a state that the disc tray is moved to a loading position from an eject position.

FIG. 1 is a plan view of the first embodiment of a disc drive according to the present invention, FIG. 2 is a plan view of a top plate of the disc drive which is viewed from the inside of a main body, FIG. 3 is a plan view showing a condition that the top plate is removed from the disc drive shown in FIG. 1, FIGS. 4 and 5 are respectively a cross-sectional side view which shows the disc drive shown in FIG. 1, FIG. 6 is a plan view showing a condition that an optical disc is erroneously placed in a disc tray of the disc drive (erroneously placed state), FIG. 7 is a cross-sectional side view showing a state that the disc tray is moved to a loading position from an eject position. Note that in these drawings, for the sake of convenience in the descriptions given below, the upper part in FIGS. 1 to 3 and FIG. 6 and the right part in FIG. 4, FIG. 5 and FIG. 7 are referred to as the "rear" or "rear part", and the lower part in FIGS. 1 to FIG. 3 and FIG. 6 and the left part in FIG. 4, FIG. 5 and FIG. 7 are referred to as the "front" or "front part".

A disc drive 1 shown in these drawings is an apparatus for carrying out playback (reproducing) or recording/playback of data recorded on an optical disc such as a music CD, a CD-ROM, a CD-R, a CD-RW, a DVD or the like.

As shown in FIG. 1 to FIG. 5, the disc drive 1 is generally constructed from a main body 2, a disc tray 11 on which an optical disc (not shown in the drawings) is to be placed and which is movable in the forward and backward directions (horizontal direction) with respect to the main body 2, and a sled mechanism unit (disc drive unit) 3 provided inside the main body 2. The structure of each element is described below.

The main body 2 includes a frame 21, a roughly box-shaped casing 22 which covers the bottom portion and the side portions of the frame 21, a top plate (cover) 23 which covers the top portion of the frame 21 (casing 22), and a front bezel 24 provided on the front part of the casing 22.

The front bezel 24 is formed with an opening 40. Namely, in the front part of the main body 2, the opening 40 is formed. The disc tray 11 is provided so as to be movable with respect to the main body 2 through the opening 240.

On the frame 21, the disc tray 11, a driving mechanism (loading mechanism) of the disc tray 11 (not shown in the drawings), the sled mechanism unit 3, a main circuit board 12 and the like are provided.

The casing 22 is fixed to the frame 21 by screws, for example, and the bottom portion of the frame 21 is covered by a bottom plate 221 of the casing 22.

Further, the top plate 23 is provided above the frame 21 and fixed to the casing 22 by screws, so that a space for receiving the disc tray 11 is created between the frame 21 and the top plate 23.

Further, both the frame 21 and the disc tray 11 are formed from a resin material (plastic).

Further, both the casing 22 and the top plate 23 are plate-shaped metal members formed into predetermined shapes by carrying out press forming or the like thereto. Further, a protruding part 231 is integrally formed on the inside (bottom) surface of the top plate 23 as shown in FIG. 2.

The main circuit board 12 has a circuit for controlling various operations of the disc drive 1. On the circuit board 12, various integrated ICs such as a microprocessor, memories, a motor driver and the like, and various electric or electronic components such as resistors, capacitors, switches and the like are mounted.

The disc tray 11 has a shallow concave disc holding portion 111, and an optical disc (not shown in the drawings) is conveyed in a state that it is placed in the disc holding portion 111.

As shown in FIG. 1, four disc holding members (hook members) 113 are provide along the outer peripheral part of the disc holding portion 111 at predetermined four locations. Each of the disc holding members 113 is rotatably provided on the disc tray 11 through an axle 114. When the disc drive 1 is used in a vertically arranged state, these disc holding members 113 are set so that they are protruded above the disc holding portion 111, thereby loosely holding an optical disc placed in the disc holding portion 111 from the side of the upper surface of the optical disc so as not to fall off from the disc holding portion 111.

These disc holding members 113 are respectively formed of a material having flexibility such as a resin material.

The disc tray 11 is driven by a driving mechanism (loading mechanism) (not shown in the drawings) provided on the frame 21, and moves (slides) in the forward and backward directions with respect to the main body 2. Namely, the disc tray 11 is movable between a position for loading (playing back or recording) an optical disc in the main body 2 (hereafter, referred to simply as the "loading position" or "loading state") and a position for ejecting the optical disc (hereafter, referred to simply as the "ejection position" or "ejection state").

When the disc tray 11 is at the loading position (the state shown in FIG. 5), all of the disc tray 11 is housed inside the main body 2, and when the disc tray 11 is at the ejection position (the state shown in FIG. 1 to FIG. 3), a major portion of the disc tray 11 is in an ejected (protruding) state outside the front end of the main body 2.

As shown in FIG. 3 to FIG. 5, a frame member 13 which supports the sled mechanism unit 3 is provided inside the main body 2. The frame member 13 has a roughly rectangular shape, and protruding shafts 131 are formed on both sides of the rear end portion of the frame member 13, respectively. The shafts 131 are supported in receiving portions formed in the frame 21 for enabling pivotal movement. In this way, the frame member 13 can pivot around the shafts 131 with respect to the main body 2.

When driven by the driving mechanism not shown in the drawings, the frame member 13 is pivotally displaced between a posture roughly parallel with the top plate 23 and the bottom plate 221 in the loading state, and a posture in which the front end is displaced downward to be inclined with respect to the top plate 23 and the bottom plate 221 in the ejection state.

The sled mechanism unit 3 is positioned inside the frame member 13. The sled mechanism unit 3 is supported on the frame member 13 via four rubber bushings (elastic members) 14 which absorb vibration.

As shown in FIG. 5, the sled mechanism unit 3 is mainly constructed from a chassis (base plate) 4, an optical disc rotation drive mechanism 5, an optical pick-up (optical head) 6 and an optical pick-up moving mechanism 7 which are provided (mounted) on the chassis 4.

The optical disc rotation drive mechanism 5 includes a spindle motor 51 and a turntable 52 fixed to the rotor of the spindle motor 51. The optical disc rotation drive mechanism 5 rotationally drives an optical disc placed on the turntable 52.

The optical pick-up 6 is equipped with an objective lens 61, an actuator 62 which drives (moves) the objective lens 61 in the optical axis direction (focusing direction) and a radial direction (tracking direction) of the optical disc, a laser light source, a light-converging optical system, a beam splitter (or half mirror), a light-receiving element for detecting data and for detecting focusing signals and tracking signals, and an pick-up base 63 which supports these elements. In this structure, the laser light reflected on the recording surface of an optical disc is guided to the light-receiving element via the objective lens, the beam splitter (or half mirror) and the like.

In the loading state, the objective lens 61 is exposed to the disc holding portion 111 and faces the recording surface of the optical disc through an opening 112 formed in the disc tray 11.

The pick-up base 63 is constructed from a metal material manufactured by die casting, for example. A pair of sliding portions 64 formed with holes through which a guide shaft 76 is inserted are formed on the left side of the pick-up base 63 in FIG. 3. Further, a sliding portion 65 which engages with and slides on a guide shaft 77 is formed on the right side of the pick-up base 63 in FIG. 3.

The optical pick-up moving mechanism 7 is constructed from a forward/reverse rotatable sled motor 71, a worm 72 fixed to the rotation shaft of the sled motor 71, a large-diameter gear 73 which meshes with the worm 72, a small-diameter gear 74 which is fixed to the large-diameter gear 73 to rotate on the same shaft, a rack gear 75 which is fixed to the pick-up base 63 to mesh with the small-diameter gear 74, and the pair of guide shafts 76 and 77 which define a moving path of the pick-up base 63 for guiding thereof.

When the sled motor 71 is driven, the torque thereof is transmitted sequentially to the worm 72, the large-diameter gear 73, the small-diameter gear 74 and the rack gear 75, whereby the pick-up base 63 is moved along the guide shafts 76, 77 in a radial direction of the optical disc within a prescribed moving range. In this case, depending on the rotational direction of the sled motor 71, the pick-up base 63 moves in a direction approaching the center of rotation of the optical disc or in a direction moving away from the center of rotation of the optical disc.

The chassis 4 (sled mechanism unit 3) is pivotally displaceable with respect to the main body 2 together with the frame member 13. The shafts 131 which serve as center of the pivotal motion are positioned near the rear end (one end)

of the chassis 4. Namely, the rear end of the chassis 4 forms the center of the pivotal motion, and therefore forms a rotation end 41 which undergoes almost no displacement with respect to the main body 2, and the front end (other end) of the chassis 4 forms a displacement end 42 which is displaced roughly in the upward and downward directions with respect to the main body 2.

According to this structure, in the loading state, the chassis 4 (sled mechanism unit 3) is at a raised position where the displacement end 42 is raised (hereafter, referred to simply as the "raised position") (see FIG. 5), and in the ejection state, the chassis 4 is at a lowered position where the displacement end 42 is lowered (hereafter, referred to simply as the "lowered position") (see FIG. 4).

At the raised position, the chassis 4 forms a posture roughly parallel to the top plate 23 and the bottom plate 221, and at the lowered position, the chassis 4 forms a posture inclined with respect to the top plate 23 and the bottom plate 221.

When the chassis 4 is at the raised position, the turntable 52 is protruded (exposed) to the inside of the disc holding portion 111 through the opening 112, and in this way, the optical disc loaded inside the main body 2 is placed on the turntable 52. In this state, a disc clamper 15 which is rotatably provided on the inside of the top plate 23 is attracted to a magnet provided in the turntable 52, whereby the optical disc is held between the turntable 52 and the disc clamper 15 (see FIG. 5).

When the chassis 4 is at the lowered position, the turntable 52 and the optical pick-up 6 and the like are positioned so as not to interfere with the disc tray 11 being moved to the ejection position (see FIG. 4).

As described above, an optical disc correctly placed in the disc holding portion 11 at the eject position of the disc tray 11 is conveyed into the inside of the main body 2 by the movement of the disc tray 11 to the loading position, and then placed on the turntable 52.

However, as shown in FIG. 6, in the case where the disc tray 11 is moved to the loading position to convey an optical disc D to the inside of the main body 2 in a state where, for example, a part of the optical disc D is accidentally placed on top of two disc holding members 113 of the disc tray 11, namely, a state where a part of the optical disc D protrudes out from the disc holding portion 111 at the front side of the disc holding portion 111 (hereafter, this state is referred to as an "erroneously placed state"), the optical disc D can not be loaded (placed) on the turntable 52. For this reason, in this case, the disc tray 111 must be moved to the ejection position to eject the optical disc D from the main body 2.

As shown in FIG. 5 and FIG. 7, in the present invention, the top plate 23 is provided with a convex portion (protruding portion) 231 which protrudes to the inside of the main body 2. The convex portion is positioned inside a region of the inside (bottom) surface of the top plate 23 corresponding to the disc holding portion 111 in a state that the disc tray 11 is fully inserted into the main body 2 (i.e., at the time the disc tray 11 is moved to the loading position). In the present embodiment, the convex portion 231 is provided inside the above-described region of the top plate 23 near the opening 240. The convex portion 231 has a function of regulating the posture of the optical disc D, namely, a function of preventing the optical disc D from being caught near the opening 240 (at the upper side rear end of the front bezel 24). Accordingly, even in the case where the disc tray 11 is moved to the loading position with the optical disc D being in an erroneously placed state (erroneously loaded state), it is possible to prevent the optical disc D from being caught on the upper side rear end of the front panel 24 at the time the disc tray 11 is moved toward the ejection position, thereby enabling to smoothly move the disc tray 11 to the ejection position.

Specifically, in the case where the disc tray 11 is moved to the loading position with the optical disc D being in an erroneously placed state (i.e., the case where the optical disc D is erroneously inserted into the inside of the main body 2), the convex portion 231 pushes the part (at the left side in FIG. 7) of the optical disc D protruding from the disc holding portion 111 toward the disc holding portion 111, whereby the optical disc D and the disc holding members 913 on which the part of the optical disc D is lying are bent to the bottom surface of the disc holding portion 111. In this way, at the time the disc tray 11 is moved to the ejection position, it is possible to prevent the optical disc D from being caught near the opening 240.

Now, the feature of the present invention resides in that the convex portion 231 has a shape in which the horizontal cross-sectional area decreases gradually toward the tip thereof. In the present embodiment, the convex portion 231 has a peripheral surface 232 formed as an inclined surface.

In this regard, for the sake of comparison, we assume, for example, that the top plate 23 is provided with a convex portion having a rectangular parallelepiped shape like the prior art described above, namely, a convex portion having a shape in which the horizontal cross-sectional area thereof does not change toward the tip (i.e., a shape in which the peripheral surface is roughly perpendicular to the top plate 23). In such a case, the air flow (i.e., the flow of air) generated at the time the optical disc D is rotated (at high speed) changes abruptly near the convex portion 930, so that the optical disc D is pushed (downward) toward the disc holding portion 911. Consequently, the recording surface of the optical disc is shifted away from the focusing position of the laser light emitted from the optical pickup, and this has an adverse effect on the recording and playback characteristics. Further, when the spindle motor 51 for rotationally driving the optical disc D reaches a specific rotation number, the optical disc D will resonate with the vibration of the spindle motor 51. In this case, when the downward force described above is applied to the optical disc D, the inclination of the optical disc D will become even larger, and this results in significantly lowering the recording and playback characteristics of the optical disc D.

In contrast with this, in the present invention, because the shape of the convex portion 231 described above allows air to flow along the surface of the convex portion 231, it is possible to suppress (prevent) the airflow (i.e., the flow of air) generated at the time the optical disc D is rotated (at high speed) from changing abruptly near the convex portion 231 (i.e., it is possible to suppress or prevent increases in the amount of change of air flow near the convex portion 231). In this way, it is possible to suppress (prevent) the lowering of the recording and playback characteristics of the optical disc D caused by an increase in the amount of change of air flow (i.e., air flow turbulence) near the convex portion 231.

In this case, the angle (i.e., the angle $\theta 1$ in FIG. 4) formed between the peripheral surface 232 and the top plate 23 is not limited to any particular value, but is preferably in the range of about 110 to 150°, and more preferably in the range of about 125 to 135°. By setting the angle $\theta 1$ to these ranges, the effect described above can be improved.

Further, the convex portion 231 is formed to have an elliptical horizontal cross-section. In this way, air is able to flow along the surface of the convex portion 231 more smoothly, and this makes it possible to more efficiently suppress (prevent) abrupt changes in the air flow (air flow turbulence) near the convex portion 231.

Further, the convex portion 231 has a tip surface 233 formed as a flat surface, and when the disc tray 11 is moved to the loading position, the tip surface 233 and the bottom surface of the disc holding portion 111 are roughly parallel to each other. By forming the convex portion 231 to have this structure, air is able to flow along the surface of the convex portion 231 more smoothly, and this makes it possible to more efficiently suppress (prevent) turbulence in the air flow near the convex portion 231. Further, at the time the disc tray 11 is moved from the loading position toward the ejection position, the optical disc D in an erroneously placed state slides with its top surface being in contact with the convex portion 231, but because the convex portion 231 has the structure described above, it is possible to reduce the sliding friction between the optical disc D and the convex portion 231, thereby enabling to prevent the top surface of the optical disc D from being damaged.

Further, in the present embodiment, the convex portion 231 is integrally formed with the top plate 23. For this reason, compared with the case where a separate member formed from a rubber sheet or the like is fastened (fixed) to the top plate 23, it is possible to reduce the number of manufacturing steps and the number of parts of the disc drive 1, and this makes it possible to improve the productivity of the disc drive 1.

The method of forming the convex portion 231 is not limited to any particular methods, but press working or drawing is preferably used. By carrying out such plastic working, it is possible to easily form the convex portion 231.

Further, the shape of the convex portion 231 is not limited to the shape shown in the drawings. For example, the shape of the horizontal cross section of the convex portion 231 can be a polygon such as a triangle, a square, a rhombus, a hexagon or the like, or a circle or the like.

Further, the convex portion 231 is not limited to one that is integrally formed with the top plate 23. For example, a separate member constructed from a rubber sheet or the like may be fastened (fixed) to the top plate 23 by an adhesive or the like.

Second Embodiment

Next, a description will be given for the second embodiment of a disc drive of the present invention.

Figure 8:
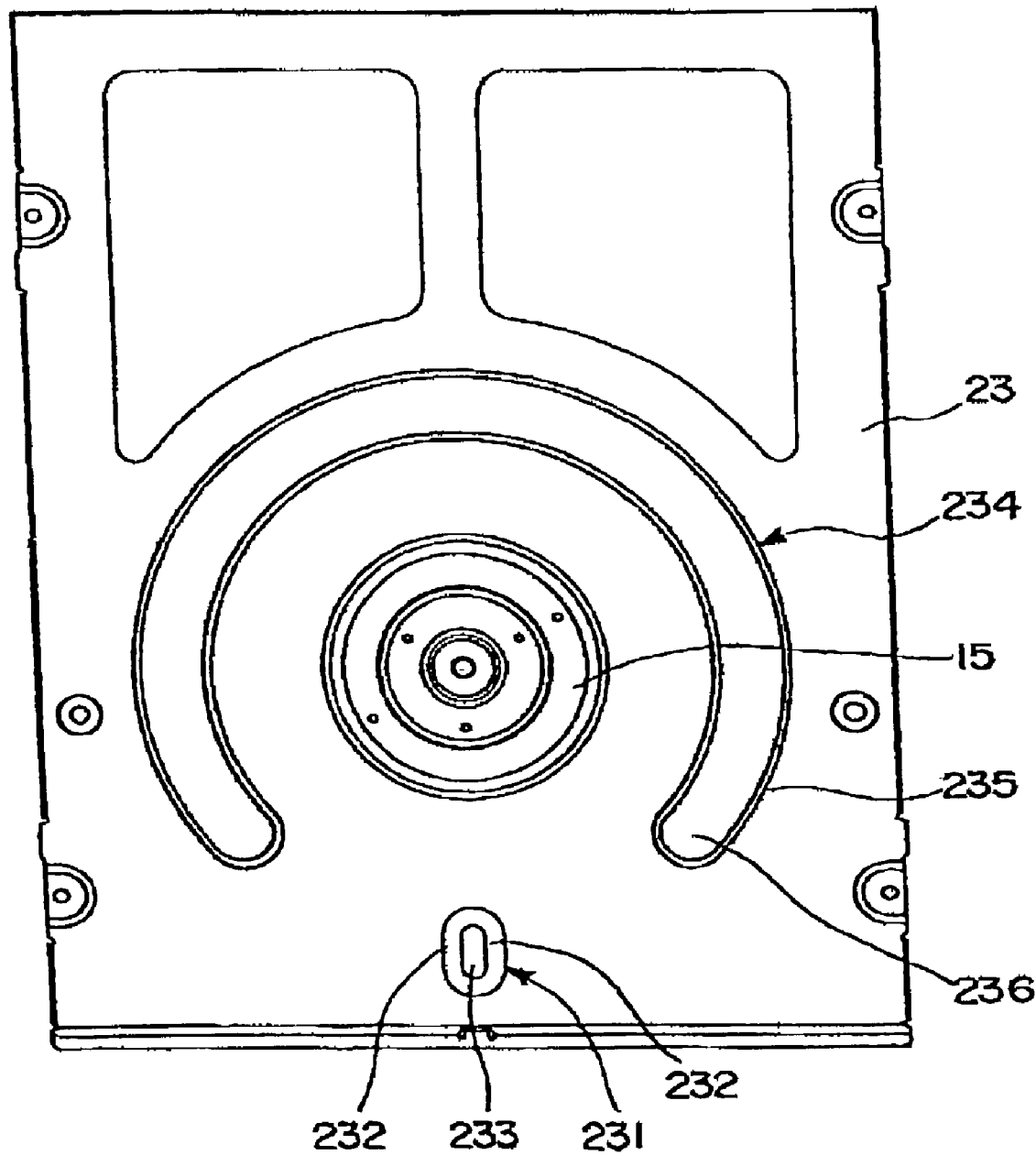
FIG. 8 is a plan view of a top plate provided in a disc drive of a second embodiment, which is viewed from the inside of a main body thereof.
Figure 9:
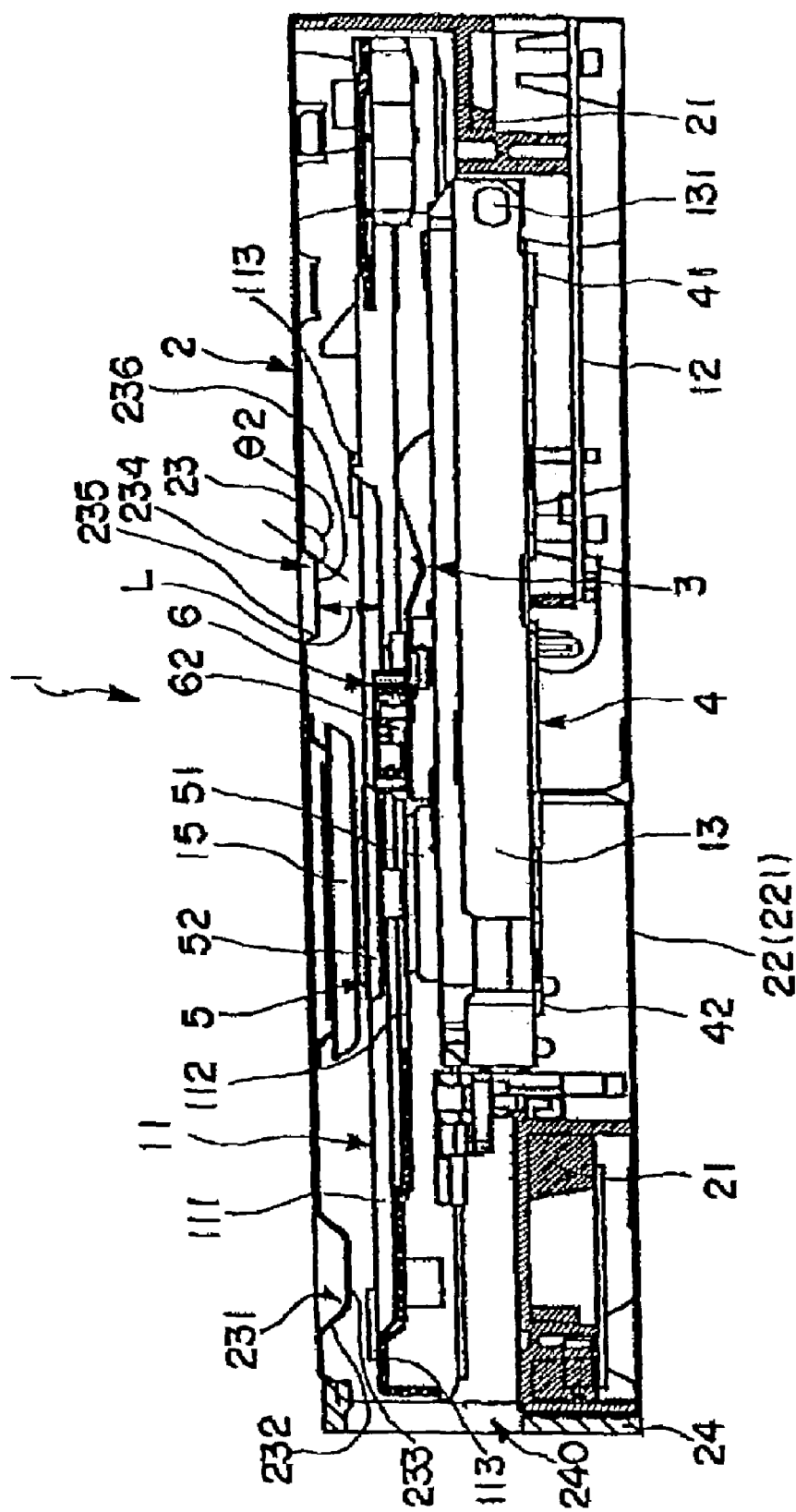
FIG. 9 is a cross-sectional side view of the disc drive of the second embodiment.

FIG. 8 is a plan view of a top plate provided in the disc drive of the second embodiment, which is viewed from the inside of a main body thereof, and FIG. 9 is a cross-sectional side view of the disc drive of the second embodiment.

The following description of the disc drive of the second embodiment will focus on the points different from the first embodiment, and a description of the same elements is omitted.

In the disc drive 1 of the second embodiment, the top plate 23 is provided with a convex portion 231 and a convex ridge 234, and the other elements are the same as those of the first embodiment.

Namely, as shown in FIG. 9, the top plate 23 of the second embodiment is provided with a convex portion 231 having the same structure as that of the first embodiment and a roughly arc-shaped ridge portion (convex ridge) which protrudes to the inside of the main body 2. These convex portion 231 and the ridge portion are arranged inside a region corresponding to the disc holding portion 111 in a state that the disc tray 11 is fully inserted into the main body 2 (i.e., at the time the disc tray 11 is moved to the loading position).

Specifically, the ridge portion 234 is provided so as to form an arc shape with the center thereof positioned roughly at the center of rotation of the optical disc D (disc clamp 15).

The ridge portion 234 has a function (flow adjustment action) of adjusting the air flow (i.e., the flow of air) generated at the time the optical disc D is rotated (at high speed), and in the present embodiment, the ridge portion 234 and the convex portion 231 form a flow adjustment means (air flow adjustment means).

Further, the height of the ridge portion 234 is set to be lower than the height of the convex portion 231. In this way, the flow adjustment means formed by the ridge portion 234 and the convex portion 231 will function in an optimum manner.

Further, the ridge portion 234 has a shape in which the horizontal cross-sectional area decreases gradually toward the tip thereof. In the present embodiment, the ridge portion 234 has a peripheral surface 235 formed as an inclined surface. By forming the ridge portion 234 to have this shape, it is possible to more efficiently adjust (control) the air flow generated at the time the optical disc D is rotated (at high speed). In this way, it is possible to more reliably suppress (prevent) the lowering of the recording and playback characteristics of the optical disc D caused by turbulence in the air flow.

In this case, the angle (i.e., the angle $\theta 2$ in FIG. 9) formed between the peripheral surface 235 and the top plate 23 is not limited to any particular value, but is preferably in the range of about 100 to 150°, and more preferably in the range of about 135 to 145°. By setting the angle $\theta 2$ to these ranges, the effect described above can be improved.

Further, the ridge portion 234 has a tip surface 236 formed as a flat surface, and when the disc tray 11 is moved to the loading position, the tip surface 236 and the bottom surface of the disc holding portion 111 are roughly parallel to each other. By forming the ridge portion 234 to have this structure, it is possible to more efficiently adjust the air flow.

The distance (length L shown in FIG. 9) between the tip surface 236 of the ridge portion 234 and the bottom surface of the disc holding portion 111 is not limited to any particular value, but is preferably in the range of about 8 to 10 mm, and more preferably in the range of about 8.5 to 9.5 mm. By setting the length L to these ranges, the convex ridge 234 will exhibit a particularly effective flow adjustment action.

Further, in the present embodiment, the ridge portion 234 is integrally formed with the top plate 23. By integrally forming the ridge portion 234 with the top plate 23, compared with the case where a separate member formed from a rubber sheet or the like is fastened (fixed) to the top plate 23, it is possible to reduce the number of manufacturing steps and the number of parts of the disc drive 1. For this reason, it is possible to improve the productivity of the disc drive 1.

The method of forming the ridge portion 234 is not limited to any particular methods, but press working or drawing is preferably used. By carrying out such plastic working, it is possible to easily form the ridge portion 234.

Further, the horizontal cross-sectional shape of the ridge portion 234 is not limited to the shape shown in the drawings, and may be any shape which makes it possible to adjust the air flow generated at the time the optical disc D is rotated. Further, the ridge portion 234 is not limited to one continuous ridge, and may be formed from a plurality of ridges provided at prescribed spacings, for example.

Further, the convex portion 231 and the ridge portion 234 are not limited to being integrally formed with the top plate 23. For example, the convex portion 231 and/or the ridge portion 234 may be a separate member constructed from a rubber sheet or the like which is fastened (fixed) to the top plate 23 by an adhesive or the like.

According to the disc drive 1 of the second embodiment, it is possible to obtain the same effect as the first embodiment.

Further, the convex portion 231 can be omitted as needed (e.g., in accordance with the type or the like of the disc drive 1). Namely, in the disc drive 1 of the present invention, the top plate 23 maybe provided with just the ridge portion 234. Even in this case, the ridge portion 234 exhibits the optimum flow adjustment action described above.

Third Embodiment

Next, a description will be given for the third embodiment of a disc drive of the present invention.

Figure 10:
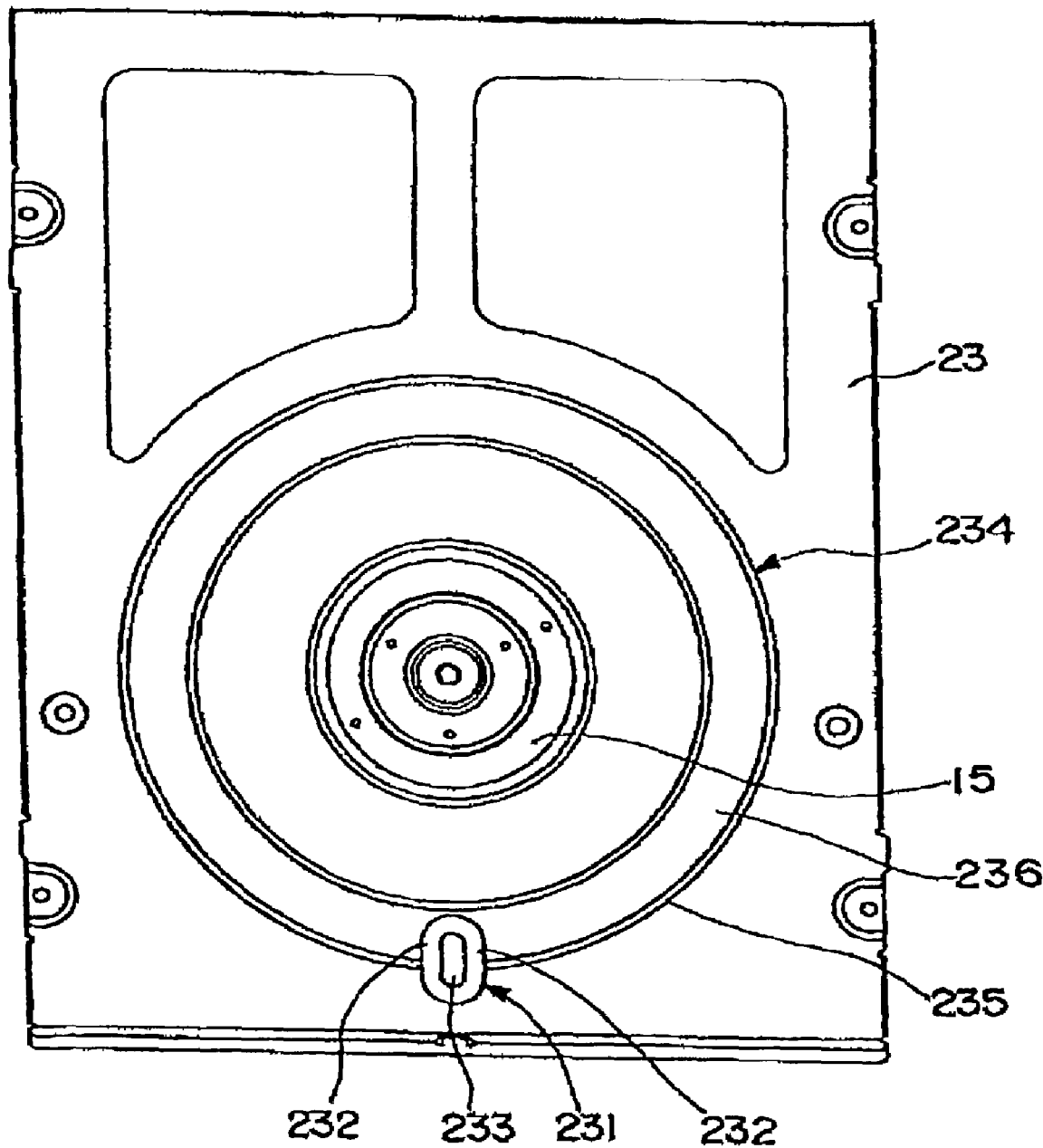
FIG. 10 is a plan view of a top plate provided in a disc drive of a third embodiment, which is viewed from the inside of a main body thereof.
Figure 11:
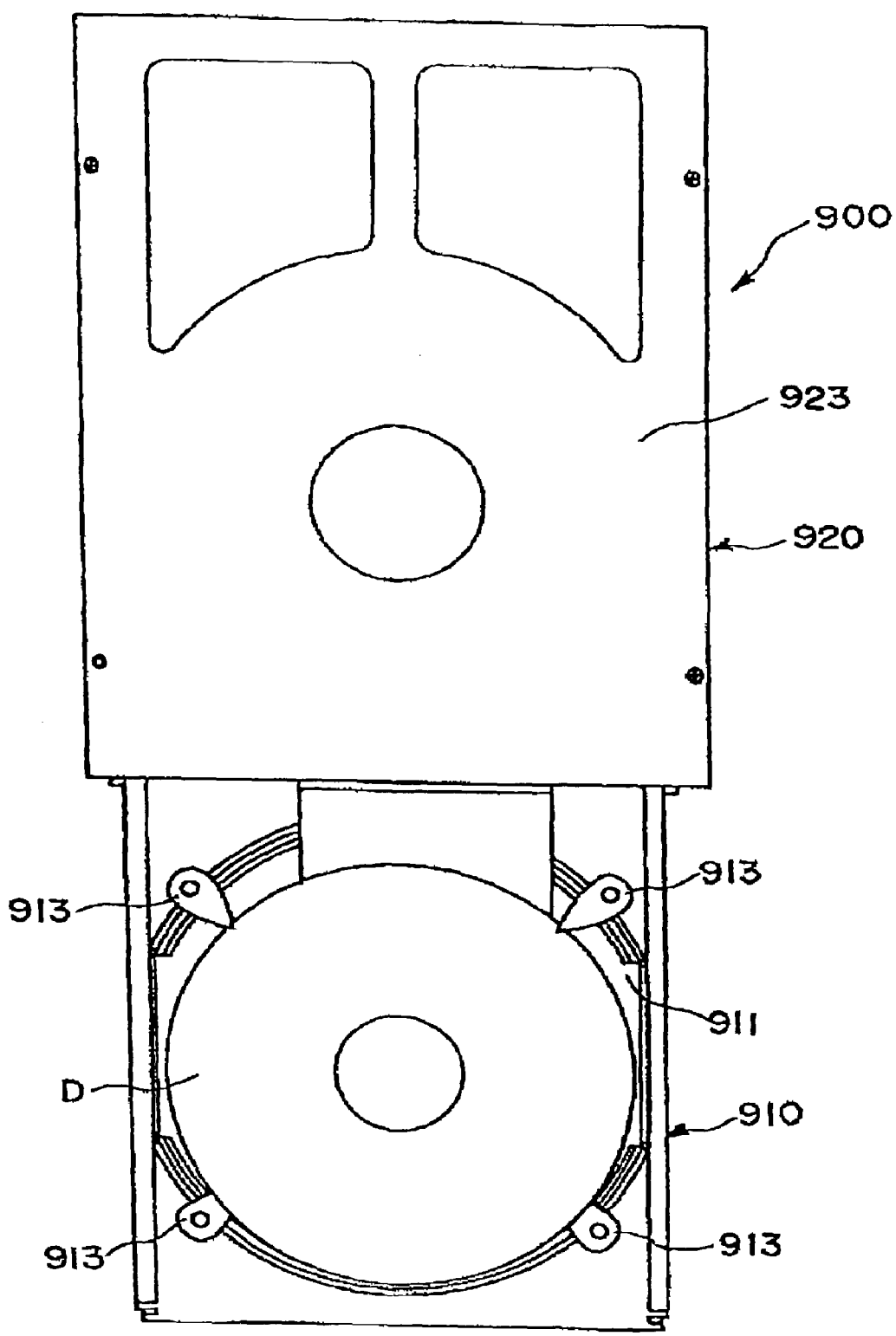
FIG. 11 is a plan view showing a prior art optical disc drive which can be used in a vertically arranged state.
Figure 12:
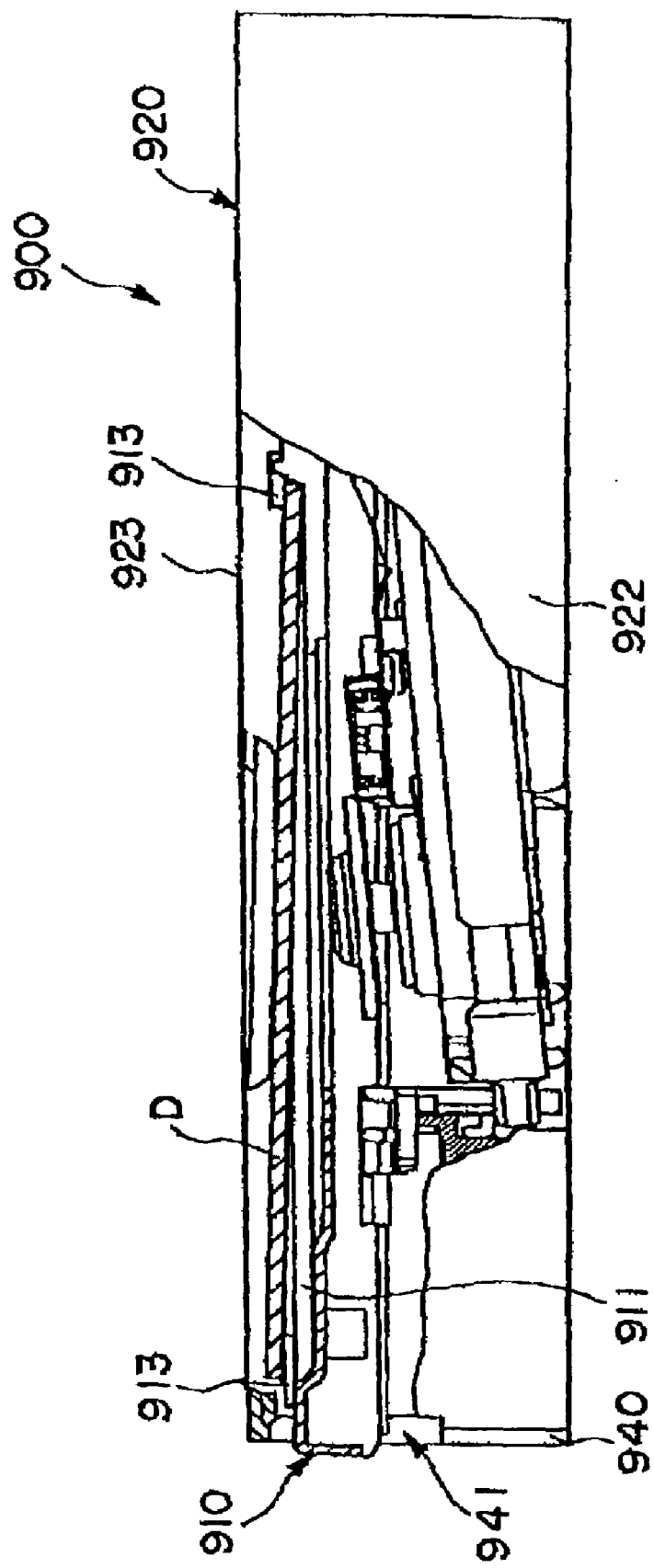
FIG. 12 is a partial cross-sectional side view (showing the state in which the disc tray is moved to the ejection position) of the optical disc drive shown in FIG. 11.
Figure 13:
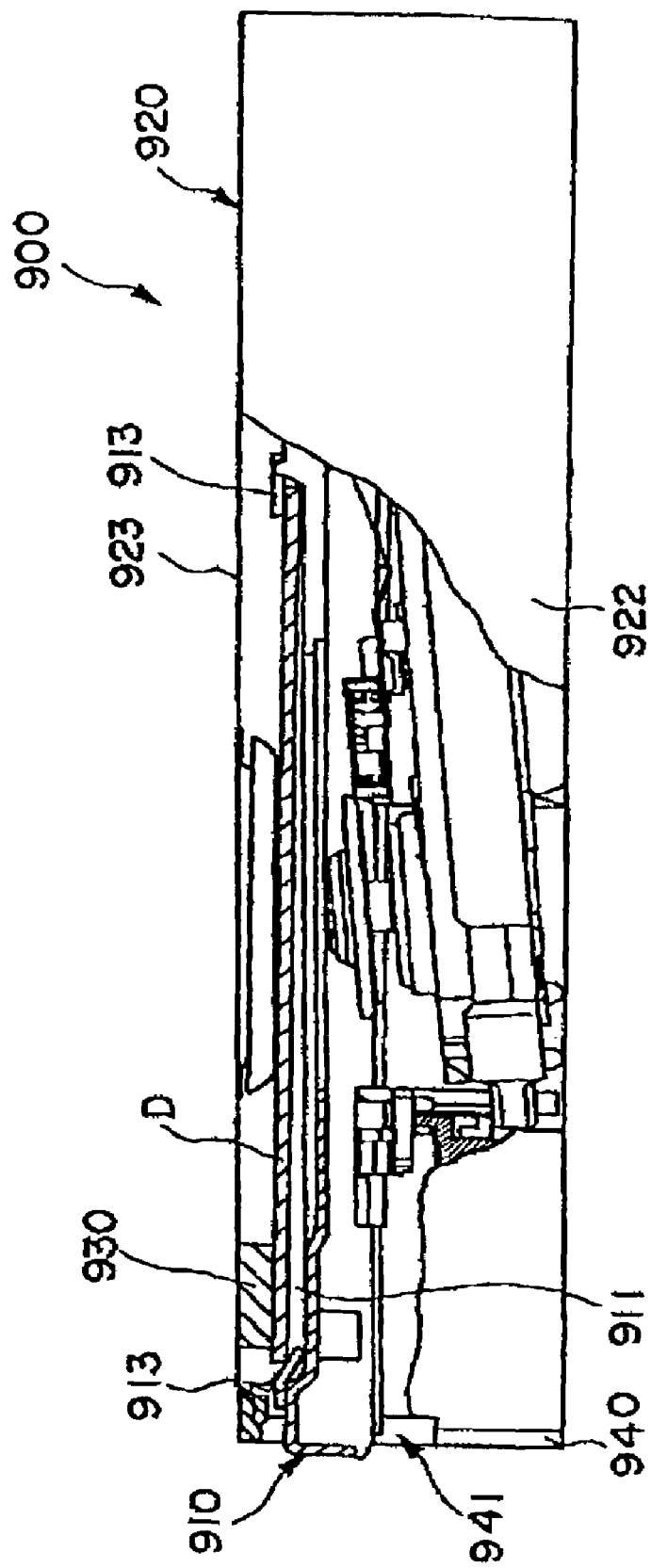
FIG. 13 is a partial cross-sectional side view showing another example structure of a prior art optical disc drive.

FIG. 10 is a plan view of a top plate provided in the disc drive of the third embodiment, which is viewed from the inside of a main body thereof.

The description of the disc drive of the third embodiment will focus on the points different from the first embodiment and the second embodiment, and a description of the same elements is omitted.

In the disc drive 1 of the third embodiment, a part of the convex portion 231 is connected to a part of the ridge portion 234, and the other elements are the same as those of the second embodiment.

In this way, because it is possible to increase the formation region of the ridge portion 234, it is possible to more reliably adjust (carry out flow adjustment) of the air flow (i.e., the flow of air) generated at the time the optical disc is rotated (at high speed). As a result, it is possible to more reliably prevent the recording and playback characteristics of the optical disc D from being lowered.

According to the disc drive 1 of the third embodiment, it is also possible to obtain the same effect as the first and second embodiments.

The disc drive of the present invention was described for the embodiments shown in the drawings, but the present invention is not limited to those embodiments, and it is possible to replace each element forming the disc drive with any elements exhibiting the same function. Further, any desired structural elements can also be added thereto.

Further, in each of the embodiments described above, the convex portion was described as having a function of preventing erroneous insertion of the optical disc, but the convex portion may be given any other function in place of such erroneous insertion preventing function, or the convex portion may be given two or more functions which include the function of preventing erroneous insertion of the optical disc and any other function. In such cases, the position of the convex portion is not limited to the arrangement near the opening of the front bezel, and the convex portion may be provided at any position inside the region corresponding to the disc holding portion in a state that the disc tray is fully inserted into the inside of the main body.

As described above, the present invention makes it possible to suppress (prevent) turbulence in the air flow (i.e., the flow of air) generated at the time the optical disc is rotated (at high speed).

Further, the present invention makes it possible to adjust the air flow (i.e., carry out flow adjustment).

Accordingly, the present invention makes it possible to prevent the recording and playback characteristics of the optical disc from being lowered.

Finally, it is needless to mention that the present invention is not limited to the above-described embodiments but can be modified or improved in various ways within the scope described in claims.

What is claimed is:

1. An optical disc drive, comprising:
   a main body which includes a frame having a top portion, side portions, a bottom portion and a front side, a box-shaped metal housing which houses the frame therein, and a front bezel having an opening and provided on the front side of the frame wherein the metal housing has a bottom plate for covering the bottom portion of the frame, side plates for covering the side portions of the frame and a top plate for covering the top portion of the frame;
   means for rotating an optical disc, the rotating means provided inside the main body and including a turn table on which the optical disc is to be placed, a disc clamp for clamping the optical disc between the turn table and the disc clamper and a spindle motor for rotating the turn table;
   a disc tray having a disc holding portion in which the optical disc is to be placed, the disc tray being movable with respect to the main body through the opening thereof; and
   means for preventing deformation of the optical disc caused by turbulence in air flow which is generated at a high speed of rotation of the optical disc by the rotating means, the deformation preventing means comprising at least one convex portion integrally formed on the top plate so as to protrude towards the disc holding portion of the disc tray in a state which the disc tray is fully inserted into the main body at a position near the outer periphery of the optical disc placed on the disc holding portion wherein the convex portion has an elliptical cross-sectional shape so that a horizontal cross-sectional area of the convex portion decreases gradually toward a tip thereof to form an inclined peripheral surface, and the convex portion is arranged so that along axis of the convex portion is aligned with a radial direction of the optical disc in which the inclined peripheral surface thereof faces a direction of the rotation of the optical disc wherein the angle defined by the inclined peripheral surface and the top plate is in the range of 110° to 150°.

2. The disc drive of claim 1 wherein the tip of the convex portion is formed into a flat surface substantially parallel to the top plate.

3. The disc drive of claim 1, wherein the deformation preventing means further includes a ridge portion integrally formed on the top plate so as to protrude toward the disc holding portion of the disc tray in a state which the disc tray is fully inserted into the main body at a position near the outer periphery of the optical disc to be placed on the disc holding portion, the ridge portion having a roughly arc-shape which is co-centrical to the outer periphery of the optical disc and arranged at a position slightly inside the outer periphery of the optical disc, and the ridge portion being formed into a shape in which its horizontal cross-sectional area decreases gradually toward a tip thereof.

4. The disc drive of claim 3, wherein the roughly arc-shape of the ridge portion has a first end and a second end, and the convex portion is arranged between the first end and the second end of the roughly arc-shape of the ridge portion.

5. The disc drive of claim 4 wherein the roughly arc shape of the ridge portion extends through an angle of substantially 270°.

6. The disc drive of claim 3 wherein the convex portion and the ridge portion are arranged so to that the ridge portion is partially connected to the convex portion.

7. The disc drive of claim 1 wherein the deformation preventing means further includes a ridge portion integrally formed on the top plate so as to protrude toward the disc holding portion of the disc tray in a state that the disc tray is fully inserted into the main body at a position near the outer periphery of the optical disc to be placed on the disc holding portion, the ridge portion having a roughly circular shape which is co-centrical to the outer periphery of the optical disc and arranged at a position slightly inside the outer periphery of the optical disc, and the ridge portion being formed into a shape in which its horizontal cross-sectional area decreases gradually toward a tip thereof.

8. A disc drive, comprising:
a main body which includes a frame having a top portion, side portions, a bottom portion and a front side, a box-shaped metal housing which houses the frame therein, and a front bezel having an opening and provided on the front side of the frame wherein the metal housing includes a bottom plate for covering the bottom portion of the frame, side plates for covering the side portions of the frame and a top plate for covering the top portion of the frame;
means for rotating an optical disc, the rotating means provided inside the main body, and including a turn table on which the optical disc is placed, a disc clamper for clamping the optical disc between the turn table and the disc clamper and a spindle motor for rotating the turn table;
a disc tray having a disc holding portion in which an optical disc is to be placed, the disc tray being movable with respect to the main body through the opening thereof; and
means for preventing deformation of the optical disc caused by turbulence in air flow which is generated at a high speed rotation of the optical disc by the rotating means, the deformation preventing means comprising a ridge portion integrally formed on the top plate so as to protrude toward the disc holding portion of the disc tray in a state which the disc tray is fully inserted into the main body at a position near an outer periphery of the optical disc to be placed on the disc holding portion wherein the ridge portion has a roughly arc-shape which is co-centrical to the outer periphery of the optical disc and arranged at a position slightly inside the outer periphery of the optical disc, and the ridge portion being formed into a shape in which a horizontal cross-sectional area of the ridge portion decreases gradually toward a tip thereof so as to have an inclined peripheral surface wherein the ridge portion extends continuously to form the arc shape wherein the distance between the tip of the ridge portion and the bottom surface of the disc holding portion is in the range of eight to ten millimeters and the angle defined by the inclined peripheral surface and the top plate is in the range of 110° to 150°.

9. The disc drive of claim 8, wherein the arc shape of the ridge portion extends through an angle of substantially 270°.

10. A disc drive, comprising:
a main body which includes a frame having a top portion, side portions, a bottom portion and a front side, a box-shaped metal housing which houses the frame therein, and a front bezel having an opening and provided on the front side of the frame, the metal housing including a bottom plate for covering the bottom portion of the frame, side plates for covering the side portions of the frame and a top plate for covering the top portion of the frame;
means for rotating an optical disc, the rotating means provided inside the main body, and including a turn table on which the optical disc is placed, a disc clamper for clamping the optical disc between the turn table and the disc clamper and a spindle motor for rotating the turn table;
a disc tray having a disc holding portion in which an optical disc is to be placed, the disc tray being movable with respect to the main body through the opening thereof; and
means for preventing deformation of the optical disc caused by turbulence in air flow which is generated at a high speed rotation of the optical disc by the rotating means, the deformation preventing means comprising a ridge portion integrally formed on the top plate so as to protrude toward the disc holding portion of the disc tray in a state which the disc tray is fully inserted into the main body at a position near an outer periphery of the optical disc to be placed on the disc holding portion, the ridge portion having a roughly circular shape which is co-centrical to the outer periphery of the optical disc and arranged at a position inside the outer periphery of the optical disc, and the ridge portion being formed into a shape in which a horizontal cross-sectional area of the ridge portion gradually decreases toward a tip thereof so as to have an inclined peripheral surface wherein the ridge portion extends continuously to form the circular shape, the distance between the tip of the ridge portion and the bottom surface of the disc holding portion is in the range of eight to ten millimeters and the angle defined by the inclined peripheral surface and the too plate is in the range of 110° to 150°.

* * * * *